(12) United States Patent
Ikeda et al.

(10) Patent No.: US 8,030,671 B2
(45) Date of Patent: Oct. 4, 2011

(54) DISPLAY ELEMENT

(75) Inventors: Azusa Ikeda, Fukaya (JP); Yasushi Kawata, Ageo (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 110 days.

(21) Appl. No.: 12/350,371

(22) Filed: Jan. 8, 2009

(65) Prior Publication Data

US 2009/0212299 A1  Aug. 27, 2009

(30) Foreign Application Priority Data

Feb. 26, 2008 (JP) ................... 2008-044746

(51) Int. Cl.
*H01L 33/00* (2010.01)

(52) U.S. Cl. ............... 257/88; 257/89; 257/E33.056

(58) Field of Classification Search .............. 257/72, 257/88, 89, 79, 98, E33.056
See application file for complete search history.

(56) References Cited

U.S. PATENT DOCUMENTS 6,906,348 B2 * 6/2005 Sugiura .................. 257/72

FOREIGN PATENT DOCUMENTS

| JP | 08-262484 | 10/1996 |
|----|-----------|---------|
| JP | 2005-258004 | 9/2005 |

* cited by examiner

*Primary Examiner* — Hoai V Pham
(74) *Attorney, Agent, or Firm* — Finnegan, Henderson, Farabow, Garrett & Dunner, L.L.P.

(57) ABSTRACT

A thin film transistor layer including a thin film transistor is formed at a liquid crystal layer side of a color filter layer on an array substrate. Since it becomes possible to form the color filter layer at a position on a relatively flat glass substrate, satisfactory characteristics of the color filter layer can be obtained. The color filter layer is unlikely to have influence on the thin film transistor layer, so that the yield can be improved.

6 Claims, 4 Drawing Sheets

DISPLAY ELEMENT

INCORPORATION BY REFERENCE

The present invention claims priority under 35 U.S.C. §119 to Japanese Patent Application No. 2008-044746 filed on Feb. 26, 2008. The content of the application is incorporated herein by reference in its entirety.

FIELD OF THE INVENTION

The present invention relates to a display element provided with a colored layer including a colored portion corresponding to each of the pixels and a switching element for driving respective pixels respectively and independently.

BACKGROUND OF THE INVENTION

Conventionally, a liquid crystal cell which is a liquid crystal display element serving as a display element to be used for a liquid crystal display serving as a liquid crystal display device which is a display device has been formed by interposing a liquid crystal layer which is a light modulation layer between an array substrate and a counter substrate.

For realizing a color display in such a liquid crystal cell, as described in, for example, Japanese Laid-open Patent Publication No. 8-262484, a construction to form a color filter layer which is a colored layer on a counter substrate has been known.

However, in a liquid crystal cell with such a construction, a high degree of alignment accuracy is required between the array substrate and counter substrate so as to prevent a color shift when forming a cell, which causes deterioration in yield.

Therefore, as shown in, for example, Japanese Laid-Open Patent Publication No. 2005-258004, a construction which has formed a color filter layer on a thin film transistor (TFT) layer of an array substrate to thereby suppress a color shift without requiring a high degree of alignment accuracy between the array substrate and counter substrate has been known.

However, in a liquid crystal cell with such a construction, it is not easy to form a color filter layer having a uniform film thickness and optical characteristics on a thin film transistor layer having unevenness, and moreover, since a color filter layer is formed on a completed thin film transistor layer, the yield is greatly affected.

As above, a liquid crystal cell improved in yield while obtaining satisfactory characteristics of a colored layer has been demanded.

The present invention has been made in view of such problems, and an object thereof is to provide a display element improved in yield while obtaining satisfactory characteristics of a colored layer.

SUMMARY OF THE INVENTION

The present invention provides a display element including a pair of substrates disposed so as to oppose each other and a light modulation layer interposed between the substrates, and formed with a plurality of pixels, which includes: a colored layer formed on one of the substrates, and including a colored portion corresponding to each of the pixels; and a switching element layer formed at one side of the light modulation layer of the colored layer, and including a switching element for driving the respective pixels respectively and independently.

In addition, forming a switching element layer at a light modulation layer side of a colored layer on one substrate makes it possible to form the colored layer at a relatively flat position, so that satisfactory characteristics of the colored layer can be obtained, and the colored layer is unlikely to have influence on the switching element layer, so that the yield can be improved.

DETAILED DESCRIPTION OF THE PREFERRED EMBODIMENT

Hereinafter, the construction of a liquid crystal element of a first embodiment of the present invention will be described with reference to FIG. 1 and FIG. 2.

Figure 1:
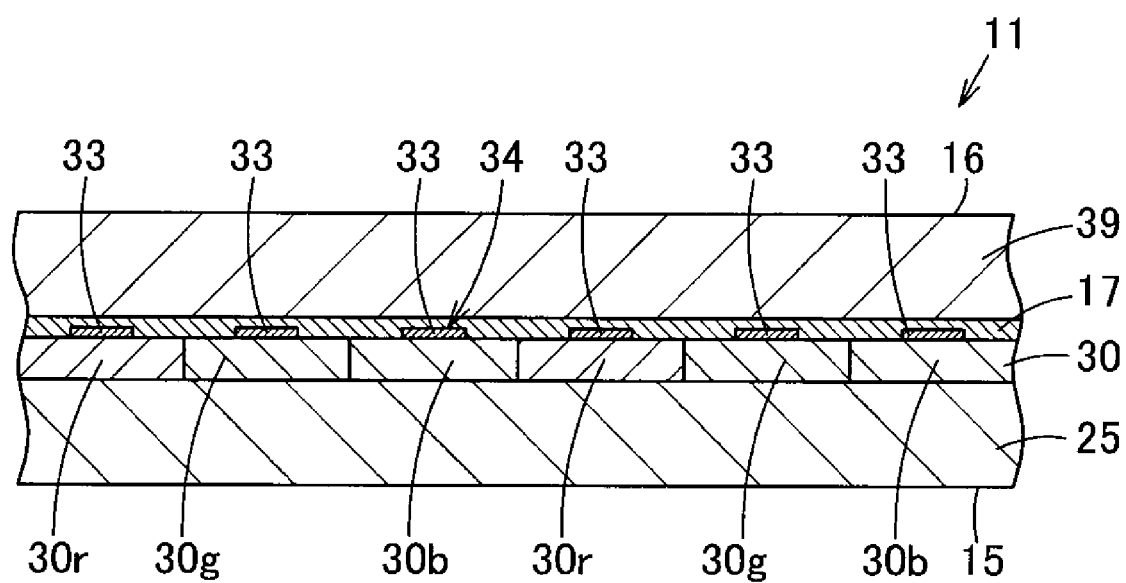
FIG. 1 is an explanatory sectional view showing the main portion of a display element of a first embodiment of the present invention.
Figure 2:
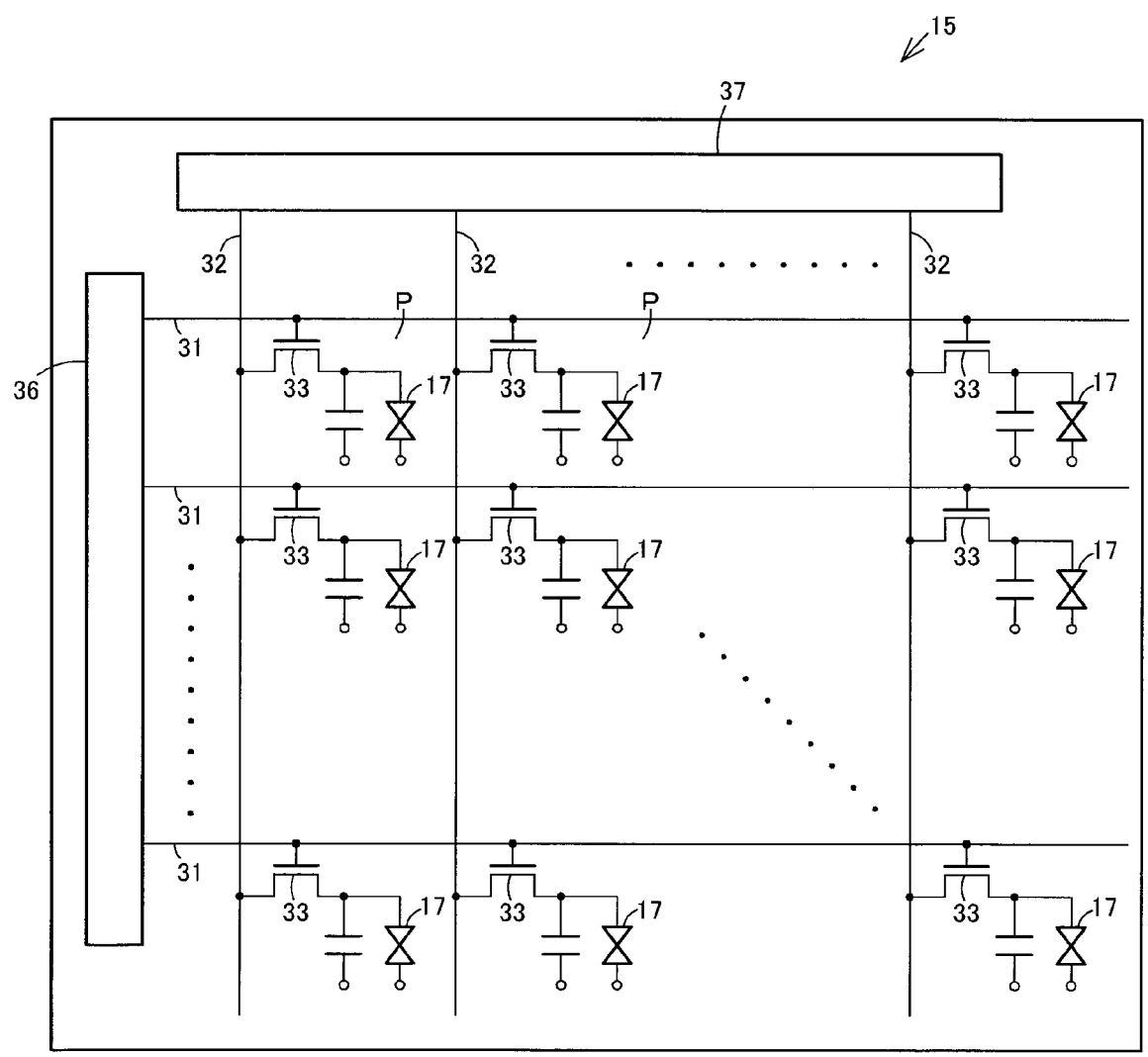
FIG. 2 is a circuit diagram showing the same display element as above.

In FIG. 1 and FIG. 2, reference numeral 11 denotes a liquid crystal cell which is a liquid crystal display element serving as a display element, and for the liquid crystal cell 11, an array substrate 15 serving as a substrate and a counter substrate 16 serving as a substrate are disposed so as to oppose each other, a liquid crystal layer 17 serving as a light modulation layer is interposed between the substrates 15 and 16, and the array substrate 15 and the counter substrate 16 are mutually adhered in the vicinities of peripheral edge portions to hold the liquid crystal layer 17 between the substrates 15 and 16. Moreover, to the liquid crystal cell 11, polarizing plates (not shown) are each adhesively attached at an opposite side to the liquid crystal layer 17, that is, a back side being a rear side of the array substrate 15 and a front side of the counter substrate 16, respectively. In addition, the liquid crystal cell 11 is of an active matrix type where sub-pixels P being a plurality of pixels are formed in a matrix and that is capable of a color display.

In the following, although description will be given assuming that the liquid crystal cell 11 is of a transmission type that uses white planar light from a backlight, as a matter of course, even a liquid crystal cell of a reflection type, a semi-transmission type, or the like can also realize the invention.

For the array substrate 15, formed on a principal surface at the liquid crystal layer 17 side (upper side in FIG. 1) of a glass substrate 25 serving as a plate-like rectangular insulating substrate having translucency is a color filter layer 30 which is a colored layer via a flattening film (not shown) or the like, disposed on the color filter layer 30 are a plurality of scanning lines 31 and a plurality of signal lines 32 in a grid pattern so as to be substantially perpendicular to each other, and provided is a thin film transistor layer 34 which is a switching element layer including, at respective intersections of the scanning lines 31 with the signal lines 32, thin film transistors (TFTs) 33 which are switching elements, and formed to cover these is an alignment film (not shown) for aligning liquid crystal particles of the liquid crystal layer 17.

The glass substrate 25 has a thickness of, for example, about 0.3 mm to 1.0 mm.

For the color filter layer 30, for example, colored portions 30*r*, 30*g*, 30*b* of R (red), G (green), B (blue), and the like are formed of a synthetic resin or the like in a striped pattern in a manner corresponding to the respective sub-pixels P.

The thin film transistor 33, which is connected with the scanning line 31 at its gate electrode, connected with the signal line 32 at its source electrode, and connected with a pixel electrode (not shown) being a transparent electrode at its drain electrode, is switching-controlled as a result of a signal from a gate driver 36 which is a scanning line driving circuit being applied to the gate electrode via the scanning line 31, and applies voltage to the pixel electrode in response to a signal input via the signal line 32 from a source driver 37 which is a signal line driving circuit.

In addition, the thin-film transistor layer 34 has a thickness of, for example, about 5 μm to 10 μm, and is arranged directly on the color filter layer 30 by, for example, direct formation. Here, when forming the thin film transistor layer 34 on the color filter layer 30, the thin film transistors 33 are provided as, for example, organic TFTs, inorganic TFTs by a low-temperature process, or the like.

For the counter electrode 16, formed on a glass substrate 39 which is a plate-like rectangular insulating substrate having translucency and corresponding to the glass substrate 25 of the array substrate 15 is a counter electrode which is a common electrode serving as a transparent electrode (not shown), and in a manner covering the counter electrode, formed is an alignment film for aligning the liquid crystal layer 17.

The counter electrode sets a common potential of each sub-pixel P.

The liquid crystal layer 17 includes a large number of liquid crystal particles (not shown) formed in slender shapes, and is, due to variation in the aligning direction of liquid crystal particles along an electric field formed between the pixel electrode and counter electrode in each sub-pixel P, capable of controlling a display state in each sub-pixel P with each polarizing plate.

The polarizing plate transmits, out of light transmitted through the liquid crystal layer 17, only linearly polarized light in a specific direction.

Next, operation of the above-mentioned first embodiment will be described.

Of light emitted from a backlight, only linearly polarized light in a specific direction is made incident by the polarizing plate into the liquid crystal layer 17 via the glass substrate 25.

In the liquid crystal layer 17, as a result of variation in the tilt angle of liquid crystal particles in each pixel P due to switching of each thin film transistor 33 in response to an image signal, linearly polarized light is emitted at a transmission amount corresponding to the image signal, and is transmitted through the glass substrate 39 and the polarizing plate to be emitted.

As above, in the above-mentioned first embodiment, adopted is a construction to form the thin film transistor layer 34 including the thin film transistors 33 at the liquid crystal layer 17 side of the color filter layer 30 on the array substrate 15.

Therefore, in the conventional case where a color filter layer is formed on a thin film transistor layer having unevenness, it is not easy to form the color filter layer with a uniform film thickness and optical characteristics, whereas, in the present embodiment, it becomes possible to form the color filter layer 30 at a position on the relatively flat glass substrate 25, so that satisfactory characteristics of the color filter layer 30 can be obtained, and there is a possibility of unfavorable influence such as damage to a completed thin film transistor layer when forming a color filter layer in the conventional case, whereas the color filter layer 30 is unlikely to have influence on the thin film transistor layer 34 in the present embodiment, so that the yield can be improved.

Furthermore, since the color filter layer 30 is formed on the array substrate 15, in comparison with the conventional case where a color filter layer is formed at the counter substrate side, alignment accuracy when the array substrate 15 and the counter substrate 16 are adhered to each other is not excessively required, so that the yield can be improved.

Moreover, as a result of forming the thin film transistor layer 34 at a thickness of about 5 μm to 10 μm, the thickness is sufficiently thinner than 0.3 mm to 1.0 mm, which is a thickness of the general glass substrate 25, and thus the distance between the liquid crystal layer 17 and the color filter layer 30 can be narrowed, and no color shift or parallax occurs.

Figure 3:
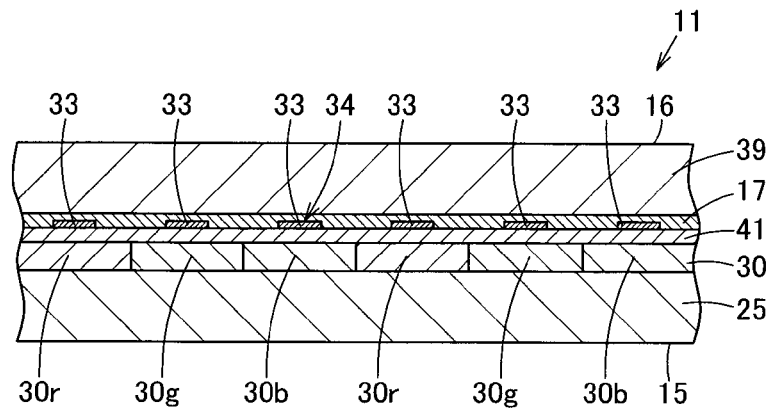
FIG. 3 is an explanatory sectional view showing the main portion of a display element of a second embodiment of the present invention.

Next, a second embodiment will be described with reference to FIG. 3. Also, the same constructions and operations as those of the above-mentioned first embodiment will be denoted with identical reference numerals, and descriptions thereof will be omitted.

For the second embodiment, in the above-mentioned first embodiment, an undercoat layer 41 which is a barrier layer and a flattening layer serving as thin film layers is formed between the color filter layer 30 and the thin film transistor layer 34.

The undercoat layer 41 is for enhancing flatness of the surface of the color filter layer 30 and barrier properties to prevent intrusion of moisture, ions, gas, or the like into the thin film transistor layer 34, and may be formed of, for example, either an organic material or an inorganic material, but preferably has as high a permeability as possible. Moreover, the undercoat layer 41 is set to such a thickness of, for example, about 0.1 μm to 50 μm so as not to produce a color shift or parallax.

In addition, as a result of having the same construction as that of the above-mentioned first embodiment, such as forming the thin film transistor layer 34 including the thin film transistors 33 at the liquid crystal layer 17 side of the color filter layer 30, the second embodiment can provide the same operations and effects as those of the above-mentioned first embodiment, and enhancing flatness of the surface of the color filter layer 30 and barrier properties for the thin film transistor layer 34 by the undercoat layer 41 allows not only uniformizing the film thickness of the thin film transistor layer 34 to obtain satisfactory characteristics, but also preventing deterioration of the thin film transistor layer 34 (thin film transistors 33) due to intrusion of moisture, ions, gas, or the like.

Furthermore, since the thickness of the undercoat layer 41 is sufficiently thinner than that of the general glass substrate 25, the distance between the liquid crystal layer 17 and the color filter layer 30 can be narrowed, and no color shift or parallax occurs.

Figure 4:
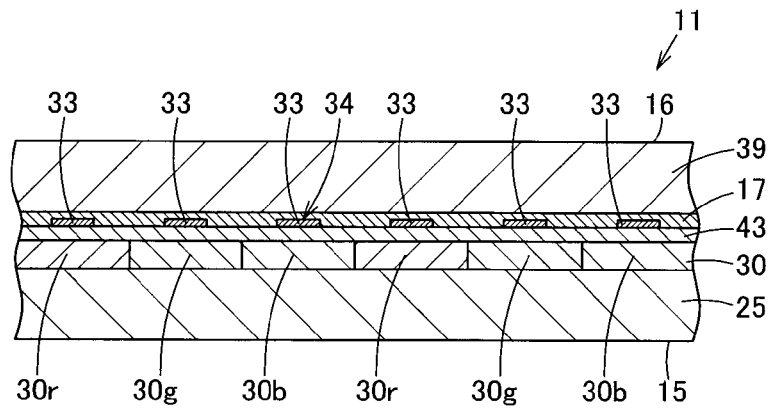
FIG. 4 is an explanatory sectional view showing the main portion of a display element of a third embodiment of the present invention.

Next, a third embodiment will be described with reference to FIG. 4. Also, the same constructions and operations as those of the above-mentioned respective embodiments will be denoted with identical reference numerals, and descriptions thereof will be omitted.

For the third embodiment, in the above-mentioned first embodiment, the thin film transistor layer 34 is transferred onto the surface of the color filter layer 30 by a transfer method, and an adhesive layer 43 serving as a thin film layer is formed between the color filter layer 30 and the thin film transistor layer 34.

When transferring the thin film transistor layer 34, used is, for example, a laser system for forming the thin film transistor layer 34 via a silicon layer or the like on a substrate such as a predetermined glass substrate (not shown), then transferring the thin film transistor layer 34 by the adhesive layer 43 onto the color filter layer 30, and peeling by a laser, an HF system for removing a glass substrate by hydrofluoric acid while using the same film composition as that for the laser system, an organic film system for forming, in advance, an organic layer of polyimide or the like between a glass substrate and the thin film transistor layer 34, transferring onto the color filter layer 30 by the adhesive layer 43, and then peeling by a laser, or the like.

The adhesive layer 43 preferably has as high a permeability as possible, and is set to such a thickness of, for example, about 10 μm to 100 μm so as not to produce a color shift or parallax.

In addition, as a result of having the same construction as that of the above-mentioned first embodiment, such as forming the thin film transistor layer 34 including the thin film transistors 33 at the liquid crystal layer 17 side of the color filter layer 30, the third embodiment can provide the same operations and effects as those of the above-mentioned first embodiment.

Moreover, since the thickness of the adhesive layer 43 is sufficiently thinner than that of the general glass substrate 25, the distance between the liquid crystal layer 17 and the color filter layer 30 can be narrowed, and no color shift or parallax occurs.

Also, in the above-mentioned third embodiment, the adhesive layer 43 may enhance flatness of the surface of the color filter layer 30 and enhance barrier properties for the thin film transistor layer 34. This allows not only uniformizing the film thickness of the thin film transistor layer 34 to obtain satisfactory characteristics, but also preventing deterioration of the thin film transistor layer 34 (thin film transistors 33) due to intrusion of moisture, ions, gas, or the like.

Figure 5:
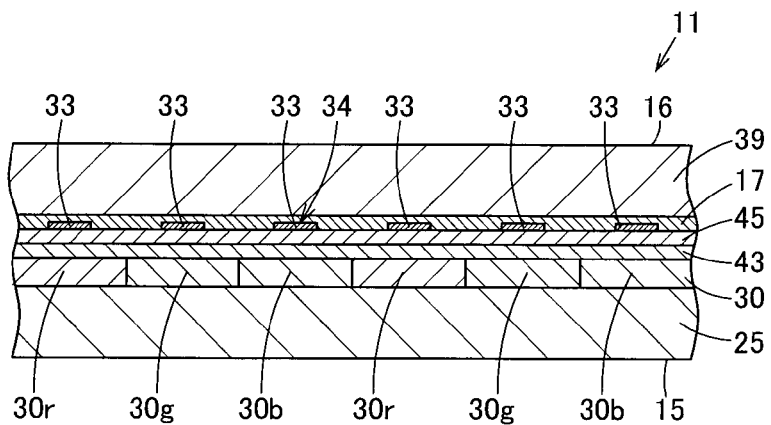
FIG. 5 is an explanatory sectional view showing the main portion of a display element of a fourth embodiment of the present invention.

Next, a fourth embodiment will be described with reference to FIG. 5. Also, the same constructions and operations as those of the above-mentioned respective embodiments will be denoted with identical reference numerals, and descriptions thereof will be omitted.

For the fourth embodiment, in the above-mentioned third embodiment, an undercoat layer 45 which is a barrier layer serving as a thin film layer is formed between the thin film transistor layer 34 and the adhesive layer 43.

The undercoat layer 45 is for enhancing barrier properties for the thin film transistor layer 34, and may be formed of, for example, either an organic material or an inorganic material, but preferably has as high a permeability as possible. Moreover, the undercoat layer 45 is set to such a thickness of, for example, about 0.1 μm to 50 μm so as not to produce a color shift or parallax.

In addition, as a result of having the same construction as that of the above-mentioned third embodiment, such as transferring and forming the thin film transistor layer 34 including the thin film transistors 33, via the adhesive layer 43, at the liquid crystal layer 17 side of the color filter layer 30, the fourth embodiment can provide the same operations and effects as those of the above-mentioned third embodiment, and enhancing barrier properties for the thin film transistor layer 34 by the undercoat layer 45 allows preventing deterioration of the thin film transistor layer 34 (thin film transistors 33) due to intrusion of moisture, ions, gas, or the like.

Moreover, since the thickness of the undercoat layer 45 is sufficiently thinner than that of the general glass substrate 25, the distance between the liquid crystal layer 17 and the color filter layer 30 can be narrowed, and no color shift or parallax occurs.

Figure 6:
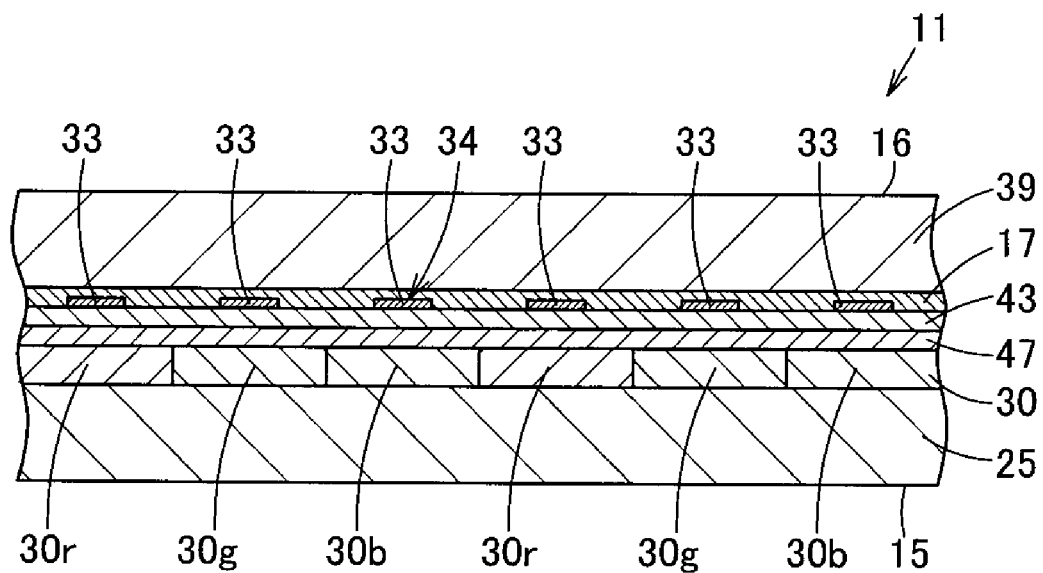
FIG. 6 is an explanatory sectional view showing the main portion of a display element of a fifth embodiment of the present invention.

Next, a fifth embodiment will be described with reference to FIG. 6. Also, the same constructions and operations as those of the above-mentioned respective embodiments will be denoted with identical reference numerals, and descriptions thereof will be omitted.

For the fifth embodiment, in the above-mentioned third embodiment, an undercoat layer 47 which is a flattening layer serving as a thin film layer is formed between the adhesive layer 43 and the color filter layer 30.

The undercoat layer 47 is for enhancing flatness of the surface of the color filter layer 30, and may be formed of, for example, either an organic material or an inorganic material, but preferably has as high a permeability as possible. Moreover, the undercoat layer 47 is set to such a thickness of, for example, about 0.1 μm to 50 μm so as not to produce a color shift or parallax.

In addition, as a result of having the same construction as that of the above-mentioned third embodiment, such as transferring and forming the thin film transistor layer 34 including the thin film transistors 33, via the adhesive layer 43, at the liquid crystal layer 17 side of the color filter layer 30, the fifth embodiment can provide the same operations and effects as those of the above-mentioned third embodiment, and enhancing flatness of the surface of the color filter layer 30 by the undercoat layer 47 allows uniformizing the film thickness of the thin film transistor layer 34 to obtain satisfactory characteristics.

Moreover, since the thickness of the undercoat layer 47 is sufficiently thinner than the thickness of the general glass substrate 25, the distance between the liquid crystal layer 17 and the color filter layer 30 can be narrowed, and no color shift or parallax occurs.

Figure 7:
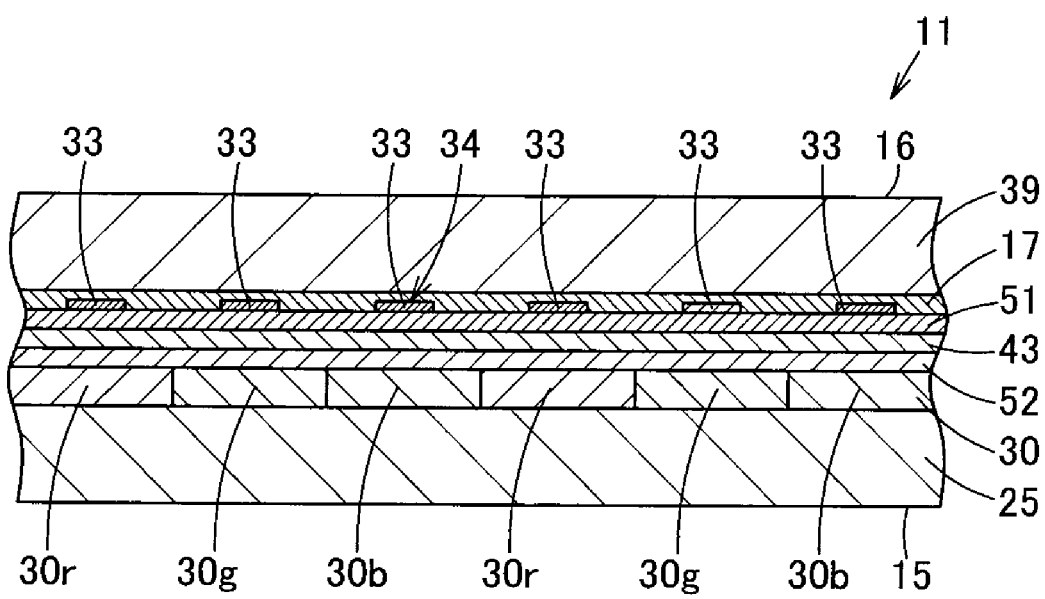
FIG. 7 is an explanatory sectional view showing the main portion of a display element of a sixth embodiment of the present invention.

Next, a sixth embodiment will be described with reference to FIG. 7. Also, the same constructions and operations as those of the above-mentioned respective embodiments will be denoted with identical reference numerals, and descriptions thereof will be omitted.

For the sixth embodiment, in the above-mentioned third embodiment, an undercoat layer 51 which is a barrier layer serving as a thin film layer is formed between the thin film transistor layer 34 and the adhesive layer 43, and an undercoat layer 52 which is a flattening layer serving as a thin film layer is formed between the adhesive layer 43 and the color filter layer 30.

The undercoat layer 51 is for enhancing barrier properties for the thin film transistor layer 34, and may be formed of, for example, either an organic material or an inorganic material, but preferably has as high a permeability as possible.

The undercoat layer 52 is for enhancing flatness of the surface of the color filter layer 30, and may be formed of, for example, either an organic material or an inorganic material, but preferably has as high a permeability as possible.

Moreover, the undercoat layers 51, 52 are set to such a thickness of, for example, about 0.1 μm to 50 μm so as not to produce a color shift or parallax.

In addition, as a result of having the same construction as that of the above-mentioned third embodiment, such as transferring and forming the thin film transistor layer 34 including the thin film transistors 33, via the adhesive layer 43, at the liquid crystal layer 17 side of the color filter layer 30, the sixth embodiment can provide the same operations and effects as those of the above-mentioned third embodiment, and enhancing barrier properties for the thin film transistor layer 34 by the undercoat layer 51 allows preventing deterioration of the thin film transistor layer 34 (thin film transistors 33) due to intrusion of moisture, ions, gas, or the like, and also enhancing flatness of the surface of the color filter layer 30 by the undercoat layer 52 allows uniformizing the film thickness of the thin film transistor layer 34 to obtain satisfactory characteristics.

Also, in the above-mentioned respective embodiments, any light modulation layer other than the liquid crystal layer 17 can be used.

What is claimed is:

1. A display element having a plurality of pixels, comprising:
   a first substrate;
   a colored layer on the first substrate, the colored layer including colored portions corresponding to the pixels;
   a switching element layer on the first substrate, the switching element layer including a plurality of switching elements for respectively and independently driving the pixels;
   a light modulation layer on the colored layer and the switching element layer; and
   a second substrate on the light modulation layer.

2. The display element according to claim 1, comprising at least one or more transparent thin film layers formed between the colored layer and the switching element layer.

3. The display element according to claim 2, wherein the thin film layer is a flattening layer of the colored layer.

4. The display element according to claim 2, wherein the thin film layer is a barrier layer for preventing foreign matter from intruding into the switching element layer.

5. The display element according to claim 1, wherein the light modulation layer is a liquid crystal layer.

6. The display element according to claim 1, wherein the switching elements comprise a thin film transistor.

* * * * *